May 12, 1936. W. L. LEEDY 2,040,092
PIPE JOINT
Filed Feb. 21, 1934
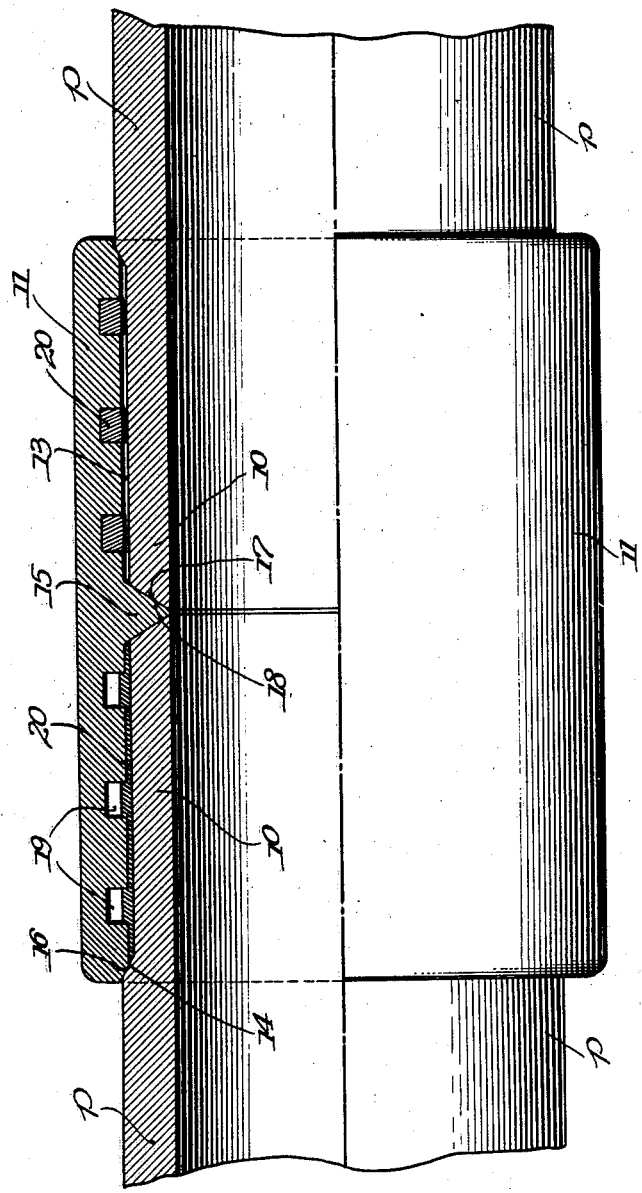
Inventor
Walter L. Leedy Patented May 12, 1936

2,040,092

UNITED STATES PATENT OFFICE 2,040,092

PIPE JOINT

Walter L. Leedy, Youngstown, Ohio

Application February 21, 1934, Serial No. 712,396

5 Claims. (Cl. 285—114)

The present invention relates to pipe joints and couplings and aims generally to improve existing joints and couplings.

Although the invention is applicable to improve joints and couplings for all types and kinds of pipes, it is particularly applicable to and the invention is mainly directed to improving the joints for standard black or galvanized wrought iron and steel pipes as distinguished from thin walled pipe or tubing and bell-end cast pipe. Standard wrought iron and steel pipes have a wall thickness varying from .62 in. for ½" pipe to .375 in. for 12" and 15" pipe.

Heretofore the conventional manner for connecting wrought iron and steel pipes was to cut threads on the end of the pipe section, which threaded end was screw-threaded into a threaded coupling or other type of fitting. The cutting of threads on the pipe ends materially reduced the wall thickness at that point. Threaded pipes usually rust through at the threaded joint first, this being the weakest spot in the joint.

It has heretofore been proposed to joint brass and copper pipes by means of a soldered joint or coupling, but in all such soldered joints of which I am aware, no provision is made confining the soldered surface to the opposed surfaces of the pipe and coupling to insure a joint of maximum strength. Such soldered joints have not been successful for joining iron and steel pipe because solder does not readily adhere to the rough surface of iron and steel pipe.

My invention aims to improve both the method of making such a joint as well as the structure of the joint itself to insure a strong sealed joint adequate for standard wrought iron and steel pipes.

In the accompanying drawing I have shown, by means of a longitudinal detailed view, one embodiment of my invention which will serve to illustrate the features of novelty and utility of the invention. The right hand side of the view illustrates the arrangement of parts before soldering, and the left hand side of the view illustrates the completed or finished joint.

According to my invention the ends of the pipe sections are prepared to fit into the coupling member and to be receptive to the sealing material. The outer surface of iron and steel pipe is more or less rough and does not readily afford a good bond with solder or the like. Also considerable tolerance is permitted in the outer diameter of pipes, and according to my invention the outer pipe diameter should have a definite relation to the inner diameter of the coupling.

Accordingly, I machine the outer surfaces of the end of the pipe P to provide a smooth clean surface of reduced diameter, as at 10, adapted to fit within the coupling member or fitting 11 and to be spaced from the walls 12 thereof so as to provide a sealing space 13. The sealing space preferably should not exceed two thousandths of an inch (.002) in thickness, and accordingly the diameter of the reduced end 10 of the pipe is from .001 in. to .002 in. less than the inner diameter of the member 11 and the normal diameter of the pipe p is slightly in excess of the internal diameter of the bore or passage of the coupling or fitting with which it is to be used.

The outer surface of the pipe P is provided with a beveled seat 14, joining the inner portion of the reduced end portion 16 to the normal outer surface of the pipe. This seat is accurately positioned with respect to the end of the pipe P so that when the reduced end 10 of the pipe P is inserted in the coupling, and the end of the pipe engages an internal seat or shoulder 15, the seat 14 will be in engagement or contact with a cooperating seat 16 on the end of the coupling. Thus the sealing space 13 will be closed at its ends by the engagement between the cooperating seats 14 and 16 and between the end of the pipe P and the shoulder 15.

Obviously a better and stronger joint is provided if the sealing space between the pipe end and coupling is of uniform thickness. This may be assured by beveling the end of the pipe P at 17 and similarly inclining the face of the seat or shoulder as at 18, so that when the pipe is inserted in the coupling, the beveled faces 17 and 18 will accurately position the pipe centrally and concentrically of the coupling. It will be apparent that, in this position, the cooperating beveled seats 14 and 16, will be in contact with each other, and if accurately made, the pipe will be positioned concentrically within the coupling.

The circular wall of the coupling 11 which is to form a wall of the sealing space 13, may be grooved as at 19 to receive a supply of solder 20, which, when heated, will flow around the pipe and completely fill the sealing space 13. However, other arrangements may be resorted to for supplying liquid solder or other sealing material thereto, as for example, the coupling may be vented so that the sealing material may be run into the sealing space, as is well understood in the art.

The coupling members may advantageously be made up in stock sizes for given sizes of pipe. Accordingly, for any given or standard size of pipe, the pipe ends may be machined so that the ends 10 are of proper diameter for the respective coupling members, and the seat 14 may be formed and accurately positioned so that alignment with the beveled seat 16 of the coupling will be assured.

A suitable fluxing agent is applied to the cleaned reduced end of the pipe, at the time the joint is to be made, and the pipe end slipped within the coupling. When in the position shown in the drawing, the cooperative engagement between the seats 14—16, 17—18, accurately positions the pipe concentrically within the coupling and at the same time closes or seals the ends of the sealing space, regardless of whether the joint is made with the pipe in vertical or horizontal position. Heat is then applied externally to the joint by means of a torch, until the solder or other sealing material is melted and permitted to fill the sealing space.

Although I have illustrated my improved joint as a straight joint or coupling, it is to be understood that the invention is not restricted solely to this form, as the invention is equally applicable to other types of joints, such as T's, L's, Y's, crosses and like shapes.

Furthermore, although the invention is especially useful for making joints between iron or steel pipes, it obviously is also applicable to joints for copper, brass and other thick wall pipe, and in this respect the invention is not to be restricted except as is required by the state of the art.

Having described one illustrative embodiment of the invention, I claim:

1. A threadless joint for wrought iron and steel pipe comprising a hollow fitting having a passage therein, a wrought iron or steel pipe section having a normal diameter in excess of the diameter of the fitting passage, and formed with a reduced shouldered end spaced from the wall of said fitting passage providing a sealing space for sealing material, an abutment formed on the fitting for engagement with the end of the pipe to position the pipe within the fitting and seal the inner end of the sealing space against leakage, the end of the fitting cooperating with the shoulder portion of the pipe for sealing the outer end of the sealing space, and means for supplying the sealing space with a melted sealing material such as solder for securely connecting and fitting the pipe together.

2. A threadless joint for standard wrought iron and steel pipe comprising a fitting having a passage therein to receive a pipe end, a section of wrought iron or steel pipe having a normal diameter in excess of the diameter of the fitting passage and formed with a reduced shouldered end portion adapted to be inserted in the fitting, the reduced end of the pipe being spaced from the wall of the fitting providing a space for sealing material, spaced bevelled seats on the fitting cooperating with the pipe end and shouldered portion thereof for positioning the pipe and fitting relative to each other and for closing the opposite ends of the sealing space, and means for supplying the sealing space with a liquid sealing material, such as solder, for securely connecting the fitting and pipe together.

3. A threadless joint for standard wrought iron and steel pipe comprising a fitting having a passage therein to receive a pipe end, a section of wrought iron or steel pipe having a normal diameter in excess of the diameter of the fitting passage and formed with a reduced, bevelled, shouldered end portion adapted to be inserted in the fitting, the reduced end of the pipe being spaced from the wall of the fitting providing a space for sealing material, spaced oppositely disposed bevelled seats on the fitting cooperating with the pipe end and bevelled shouldered portion thereof for positioning the pipe concentrically within the fitting and for closing the opposite ends of the sealing space, and means for supplying the sealing space with a liquid sealing material, such as solder, for securely connecting the fitting and pipe together.

4. A threadless joint for standard wrought iron and steel pipe comprising a fitting having a passage therein to receive a pipe end, a section of wrought iron or steel pipe having a normal diameter in excess of the diameter of the fitting passage and formed with a reduced, bevelled, shouldered end portion adapted to be inserted in the fitting, the reduced end of the pipe being spaced from the wall of the fitting and providing a uniform annular sealing space of approximately two thousandths (.002) of an inch in depth, spaced oppositely disposed bevelled seats on the fitting cooperating with the pipe end and bevelled shouldered portion thereof for positioning the pipe concentrically within the fitting and for closing the opposite ends of the sealing space, and means for supplying the sealing space with a liquid sealing material, such as solder, for securely connecting the fitting and pipe together.

5. A fitting for a pipe joint of the character described comprising a member having a tubular portion adapted to receive the pipe end, the internal diameter of the tubular portion being substantially less than the normal outside diameter of the pipe for which it is intended, the inner end of the tubular portion of the fitting terminating in an inwardly projecting shoulder adapted to engage the end of the pipe, the outer end of the tubular portion of the fitting terminating in an upwardly inclined machined seat for engagement with a shoulder on the pipe formed by reducing the diameter thereof and means for supplying a liquid sealing material such as solder to the inner surface of the tubular portion intermediate said shoulder and seat.

WALTER L. LEEDY.